No. 814,532. PATENTED MAR. 6, 1906.
G. H. GILLETTE.
SEAL FOR BOTTLES.
APPLICATION FILED APR. 25, 1905.
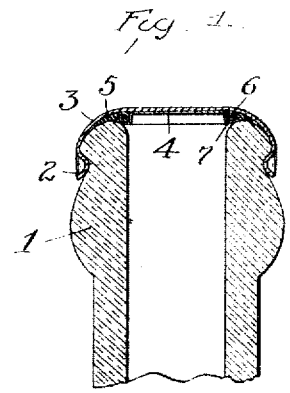
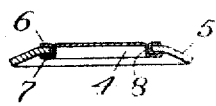
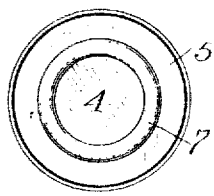
Attest
C. S. Middleton
Edward N. Sarton.
Inventor:
GEORGE H. GILLETTE

UNITED STATES PATENT OFFICE.

GEORGE H. GILLETTE, OF NEW YORK, N. Y., ASSIGNOR TO THE CROWN CORK & SEAL COMPANY, OF BALTIMORE, MARYLAND, A CORPORATION OF MARYLAND.

SEAL FOR BOTTLES.

No. 814,532.

Specification of Letters Patent.

Patented March 6, 1906.

Application filed April 25, 1905. Serial No. 257,847.

*To all whom it may concern:*

Be it known that I, GEORGE H. GILLETTE, a citizen of the United States, residing at No. 110-114 West Thirty-second street, New York, N. Y., have invented certain new and useful Improvements in Seals for Bottles, of which the following is a specification.

It is the object of the invention to provide an improvement in sealing means for the style of bottle-closure known as the "Crown," the purpose being to prevent the escape of the liquid and the gases contained in the liquid, to prevent contact between the packing material of which the sealing means is composed and the liquid, which may be detrimental to both, to prevent the liquid or the gases from reaching the metallic cap, and to prevent also the liquid and gases from reaching the compressible substance comprised in the seal.

The invention is disclosed in its broad and essential features in application for Letters Patent of the United States, filed September 10, 1901, Serial No. 74,899, Renewal No. 204,719.

The seal is in the form of a washer composed partly of compressible material and partly of metal, the metal being adapted to find a bearing about the bottle-mouth and prevent the liquid or gases and the compressible material from coming in contact with each other, which would deleteriously affect both the material and the liquid.

The invention consists in the features and combination and arrangement of parts hereinafter described, and particularly pointed out in the claims.

In the accompanying drawings, Figure 1 is a sectional view of a bottle and crown with the seal associated therewith. Fig. 2 is a sectional view of the sealing means separated from the crown. Fig. 3 is a bottom plan view of the sealing means.

In the drawings, 1 represents the bottle of well-known form having an exterior shoulder under which the flange 2 of the crown 3 is locked in any suitable manner. The sealing medium comprises a disk 4 or lining of metal of a non-corrosive character not to be affected by or affect injuriously the contents of the bottle—such, for instance, as aluminium—and a ring of compressible material 5, such as rubber, textile material covered or saturated with rubber, or cork or any suitable composition. This compressible material or packing is held permanently by the aluminium disk or lining by being clamped between flanges or edges 6 7 on the said disk. The disk, with its two annular flanges, is formed all in one piece and as completed is generally of inverted-cup form, the flange 7 being provided by doubling the sheet metal upon itself at the edge of the cup, from which point the metal is continued to provide the side of the cup and then extends outwardly to form the groove 8 and the outwardly-extending flange 6. In the groove 8, formed by the two flanges, the edge of the packing material is seated and is clamped firmly.

The parts of the sealing-washer or complete disk as thus formed are of such diameter that the packing material will rest on the lip of the bottle, where it will be compressed by the pressure exerted in applying the crown to the bottle. The metallic disk extending over the mouth of the bottle will also find a seat on the edge of the bottle-mouth by its flange 7 resting thereon, and the pressure exerted in applying and locking the crown in place forces the flange of this metallic disk or cup hard upon the bottle lip or edge and forms a perfect closure at this point, preventing the liquid from reaching the compressible material and avoiding all danger of the liquid tasting of the rubber or other material of which the packing may be composed.

The metallic disk of non-corrosive material prevents the liquid or gases from reaching the metallic crown. No collet of paraffined paper or like material need be used with this form of closure, as is found desirable with a disk packing of cork, as the metal prevents the liquid from reaching both the packing material and the metallic crown.

I claim—

1. A washer or seal for bottle-caps comprising a lining of suitable material and a packing material of ring form attached thereto, substantially as described.

2. A washer or seal for bottle-caps comprising a lining of suitable material and a ring of packing material attached thereto by a portion of the lining clamping the packing, substantially as described.

3. A washer or seal for bottle-caps comprising a lining having flanges and a ring of packing material held between the said flanges, substantially as described.

4. A washer or seal for bottle-caps comprising a lining of disk form having a ring packing attached to its periphery, substantially as described.

5. A washer or seal for bottle-caps comprising a lining comprising a cup-shaped piece of aluminium having flanges with a ring packing held between said flanges, substantially as described.

6. A washer or seal for bottle-caps comprising a cup-shaped piece having flanges one of which is of double thickness and a ring-shaped packing clamped between the two flanges, substantially as described.

7. In combination with a bottle having an exterior shoulder and a bottle-cap locked beneath said exterior shoulder, an unattached washer within the cap consisting of a piece having attached thereto packing material resting on the lip of the bottle, said piece bearing on the bottle around the edge of its mouth, substantially as described.

8. In combination with a bottle having an exterior shoulder and a bottle-cap locked beneath said exterior shoulder thereon, a washer within the cap comprising a piece having flanges about its edge, and a ring packing clamped by the flanges, said packing resting on the bottle-lip and the flange of the piece engaging the bottle-mouth about its edge, substantially as described.

9. A lining member for bottle-caps of substantially cup shape having flanges and a packing held thereby.

10. In combination with a bottle-cap, a lining therefor of inverted-cup shape having packing material attached thereto.

11. In combination with a bottle, a bottle-cap, a lining therefor of inverted-cup shape and having packing material attached thereto, said lining material resting on the lip of the bottle, substantially as described.

12. A bottle or like closure comprising a member adapted to extend across the bottle-mouth, packing material, said member having a portion extending outwardly beneath the packing to attach the packing to the said member with means adapted to engage the outer side of the bottle for holding the closure to the bottle, substantially as described.

13. A bottle or like closure comprising a cup-shaped member adapted to extend across the bottle-mouth, ring packing material, said member having a portion extending outwardly beneath the packing to hold the same to said member with means adapted to engage the outer side of the bottle for holding closure to the bottle, substantially as described.

14. A bottle or like closure comprising a member adapted to extend across the bottle-mouth, ring packing material, said member having a portion in clamping contact with the packing with means engaging the outer side of the bottle for holding closure to the bottle, substantially as described.

15. A closure comprising an outer member, a second member having flanges and a ring of packing material permanently carried between the said flanges, substantially as described.

16. A closure comprising an outer member, a second member consisting of a cup-shaped piece having flanges with a ring packing permanently carried between said flanges, substantially as described.

17. A closure comprising an outer member, a cup-shaped piece having flanges, one of which is of double thickness and a ring-shaped packing located between the two flanges, substantially as described.

18. In combination with a bottle, an outer member locked beneath an exterior shoulder thereon, a second member comprising a piece having flanges about its edge, and a ring packing between the flanges, said packing resting on the bottle-lip and the flange of the said second member engaging the bottle-mouth about its edge, substantially as described.

19. A closure comprising an outer member to be locked to the exterior of the bottle, and a second member of disk form having a packing-ring at its edge, said second member and packing-ring being carried by the outer member, substantially as described.

20. A closure comprising an outer member and a second member, consisting of a disk of material having packing material about the edge of the same, substantially as described.

21. A bottle-seal comprising an outer member having a depending flange and a portion to extend entirely over the bottle-mouth, a second member and a gasket carried permanently thereby, substantially as described.

22. A bottle or like closure comprising a member adapted to extend across the mouth of the bottle and having flanges about its edge, permanently-carried ring packing material in the space between said flanges, and means to engage the outer side of the bottle, substantially as described.

In testimony whereof I affix my signature in presence of two witnesses.

GEORGE H. GILLETTE.

Witnesses:
HERBERT A. BANNING.
HAROLD LETH.